United States Patent
Katiyar et al.

(10) Patent No.: US 12,190,397 B2
(45) Date of Patent: Jan. 7, 2025

(54) SYSTEMS AND METHODS FOR ESTIMATING ENERGY USAGE OF WORKSPACES USED IN VIRTUALIZED ENVIRONMENTS

(71) Applicant: Dell Products, L.P., Round Rock, TX (US)

(72) Inventors: Shivendra Katiyar, Bangalore (IN); Sandeep Venkatesh Pai, Bangalore (IN); Nikhil S, Thiruvananthapuram (IN)

(73) Assignee: Dell Products, L.P., Round Rock, TX (US)

( * ) Notice: Subject to any disclaimer, the term of this patent is extended or adjusted under 35 U.S.C. 154(b) by 438 days.

(21) Appl. No.: 17/648,839

(22) Filed: Jan. 25, 2022

(65) Prior Publication Data

US 2023/0237595 A1 Jul. 27, 2023

(51) Int. Cl.
*G06Q 50/06* (2024.01)
*G06F 1/3215* (2019.01)

(52) U.S. Cl.
CPC ........... *G06Q 50/06* (2013.01); *G06F 1/3215* (2013.01)

(58) Field of Classification Search
CPC ..... G06Q 50/06; G06F 1/3206; G06F 1/3215; Y02D 10/00
See application file for complete search history.

(56) References Cited

U.S. PATENT DOCUMENTS

| 11,593,472 B2 * | 2/2023 | Iyer ..................... H04L 63/0815 |
| 11,662,795 B2 * | 5/2023 | Mukherjee ................ G06F 1/28 713/340 |
| 11,841,951 B2 * | 12/2023 | Vidyadhara ........... G06F 21/575 |

* cited by examiner

*Primary Examiner* — An H Do
(74) *Attorney, Agent, or Firm* — Fogarty LLP

(57) ABSTRACT

According to one embodiment, an Information Handling System (IHS) includes a host that is executed to manage deployment of a plurality of workspaces, and executable instructions to obtain an amount of energy consumed by one or more resources of the host, obtain workspace usage metrics of each of the workspaces, and determine, using the workspace usage metrics, a proportionate amount of energy used by each of the workspaces. The instructions can, using the determined proportionate amount of energy, determine an overall amount of energy used by each workspace by distributing the amount of energy used by each of the resources across each of the workspaces according to the proportionate amount of energy used by each of the workspaces.

20 Claims, 8 Drawing Sheets

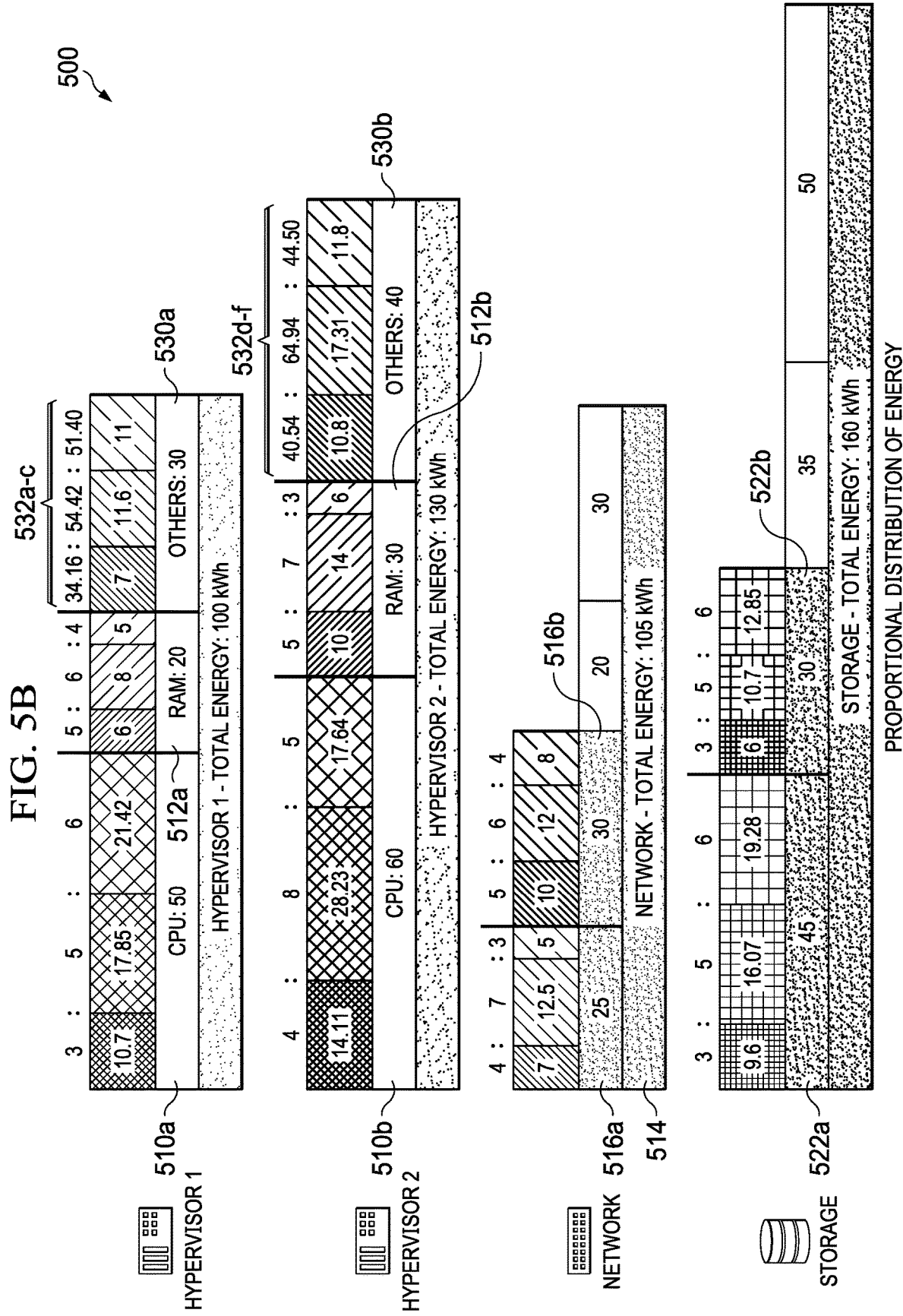

VM/CONTAINER ENERGY CALCULATION

| HYPERVISOR | POWER | | | | | | UTILIZATION | | | | |
| --- | --- | --- | --- | --- | --- | --- | --- | --- | --- | --- | --- |
| | TOTAL | CPU | MEMORY | OTHERS | NETWORK | STORAGE | VM/CONTAINER | VCPU | VRAM | NETWORK | STORAGE |
| HYPERVISOR 1 | 100 | 50 | 20 | 30 | 25 | 45 | VM1 | 3 | 5 | 4 | 3 |
| | | | | | | | VM2 | 5 | 6 | 7 | 5 |
| | | | | | | | VM3 | 6 | 4 | 3 | 6 |
| HYPERVISOR 2 | 130 | 60 | 30 | 40 | 30 | 30 | VM4 | 4 | 5 | 5 | 3 |
| | | | | | | | VM5 | 8 | 7 | 6 | 5 |
| | | | | | | | VM6 | 5 | 3 | 4 | 6 |
| NETWORK | 105 | | | | | | | | | | |
| STORAGE | 160 | | | | | | | | | | |

| VM POWER | | | | | | | |
| --- | --- | --- | --- | --- | --- | --- | --- |
| CPU | RAM | NETWORK | STORAGE | TOTAL ACCOUNTED | UNACCOUNTED | TOTAL | |
| 10.71429 | 6.666667 | 7.142857 | 9.642857 | 34.16666667 | 7.321428571 | 41.4881 | |
| 17.85714 | 8 | 12.5 | 16.07143 | 54.42857143 | 11.66326531 | 66.09184 | |
| 21.42857 | 5.333333 | 5.357143 | 19.28571 | 51.4047619 | 11.01530612 | 62.42007 | |
| 14.11765 | 10 | 10 | 6.428571 | 40.54621849 | 10.81232493 | 51.35854 | |
| 28.23529 | 14 | 12 | 10.71429 | 64.94957983 | 17.31988796 | 82.26947 | |
| 17.64706 | 6 | 8 | 12.85714 | 44.50420168 | 11.86778711 | 56.37199 | |
| | | | | 532a-f | 534a-f TOTAL | 360 540a-f | |

FIG. 5D

SYSTEMS AND METHODS FOR ESTIMATING ENERGY USAGE OF WORKSPACES USED IN VIRTUALIZED ENVIRONMENTS

BACKGROUND

As the value and use of information continue to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user, or for a specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

IHSs provide users with capabilities for accessing, creating, and manipulating data. Many organizations have determined that it is no longer necessary to operate and maintain multiple IHSs (e.g., servers, network switches, storage arrays, etc.) due to readily available virtualized Information Technology (IT) infrastructures. These virtualized infrastructures typically involve a virtualized environment where data is processed within an isolated software environment that operates on the IHS, where such isolated software environments may be referred to by various names, such as virtual machines (VMs), containers, dockers, and the like. Moreover, it has been determined that it can be more cost-efficient to outsource operations to a hosting service provider that provides enhanced economies of scale by consolidating the IT operations of many organizations into a single data center.

Sharing infrastructure resources often saves on equipment costs. For example, a hosting service provider may run and maintain applications that may be available via a software-as-a-service (SAAS) platform, or certain resources that may be available via an infrastructure-as-a-service (IAAS) platform. In such cases, the hosting service provider charges its customers based on usage of the applications or containers (e.g., VMs, dockers, etc.) using a multi-tenant architecture, which allows applications and/or containers from different organizations to simultaneously use the same hardware. The multi-tenant architecture often results in less equipment required, while requiring fewer IT personnel to maintain acceptable quality of service goals.

The hosting service providers, however, should be able to determine the costs of their equipment and labor so that it may be charged back to the user. These so-called charge-back mechanisms measure and bill for labor and equipment. Conventional charge-back mechanisms, however, have not heretofore been able to capture sufficiently accurate power utilization. Because power usage is often one of the largest costs of running a data center, accurate charge-back of energy would be beneficial for hosting service providers. However, in most multi-tenant business models, customers are not willing to pay for capacity provided by the equipment but not used, particularly when accurate estimation of energy usage per application and/or container has not heretofore been made available.

SUMMARY

Embodiments of the present disclosure provide a system and method for estimating energy usage of workspaces used in virtualized environments. According to one embodiment, computer-executable instructions are provided to obtain an amount of energy consumed by one or more resources of a host that is executed to manage deployment of multiple workspaces, obtain workspace usage metrics of each of the workspaces, and determine a proportionate amount of energy used by each of the workspaces using the workspace usage metrics. The instructions may then determine an overall amount of energy used by each workspace by distributing the amount of energy used by each of the resources according to the proportionate amount of energy used by each of the workspaces.

According to another embodiment, a method includes the steps of obtaining an amount of energy consumed by one or more resources of a host that is executed to manage deployment of a plurality of workspaces, obtaining workspace usage metrics of each of the workspaces, and determining, using the workspace usage metrics, a proportionate amount of energy used by each of the workspaces. The method also includes the step of determining an overall amount of energy used by each workspace by distributing the amount of energy used by each of the resources across each of the workspaces according to the proportionate amount of energy used by each of the workspaces.

According to yet another embodiment, a hardware memory device with computer-executable instructions is configured to, upon execution by a processor of a display, obtain an amount of energy consumed by one or more resources of a host that is executed to manage deployment of multiple workspaces, obtain workspace usage metrics of each of the workspaces, and determine, using the workspace usage metrics, a proportionate amount of energy used by each of the workspaces. The hardware memory device is also configured to determine an overall amount of energy used by each workspace by distributing the amount of energy used by each of the resources across each of the workspaces according to the proportionate amount of energy used by each of the workspaces.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIGS. 5A, 5B, 5C, and 5D illustrate an example energy usage estimation scenario showing how energy usage may be estimated for each of six workspaces in a virtualized computing environment according to one embodiment of the present disclosure.

DETAILED DESCRIPTION

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Embodiments of the present disclosure provide a system and method for estimating energy usage of workspaces used in virtualized environments. Whereas conventional datacenters operated by hosting service providers would charge customers at predefined tariffs as per subscribed plans irrespective of the actual usage of the hardware, such an arrangement could cause disproportionate charge-back thus yielding customer dissatisfaction. Embodiments of the present disclosure provide a solution to this problem, among others, by providing a workspace energy usage estimation system and method that accurately assesses how much energy is consumed by each application and/or container leased to their customers.

Figure 1:
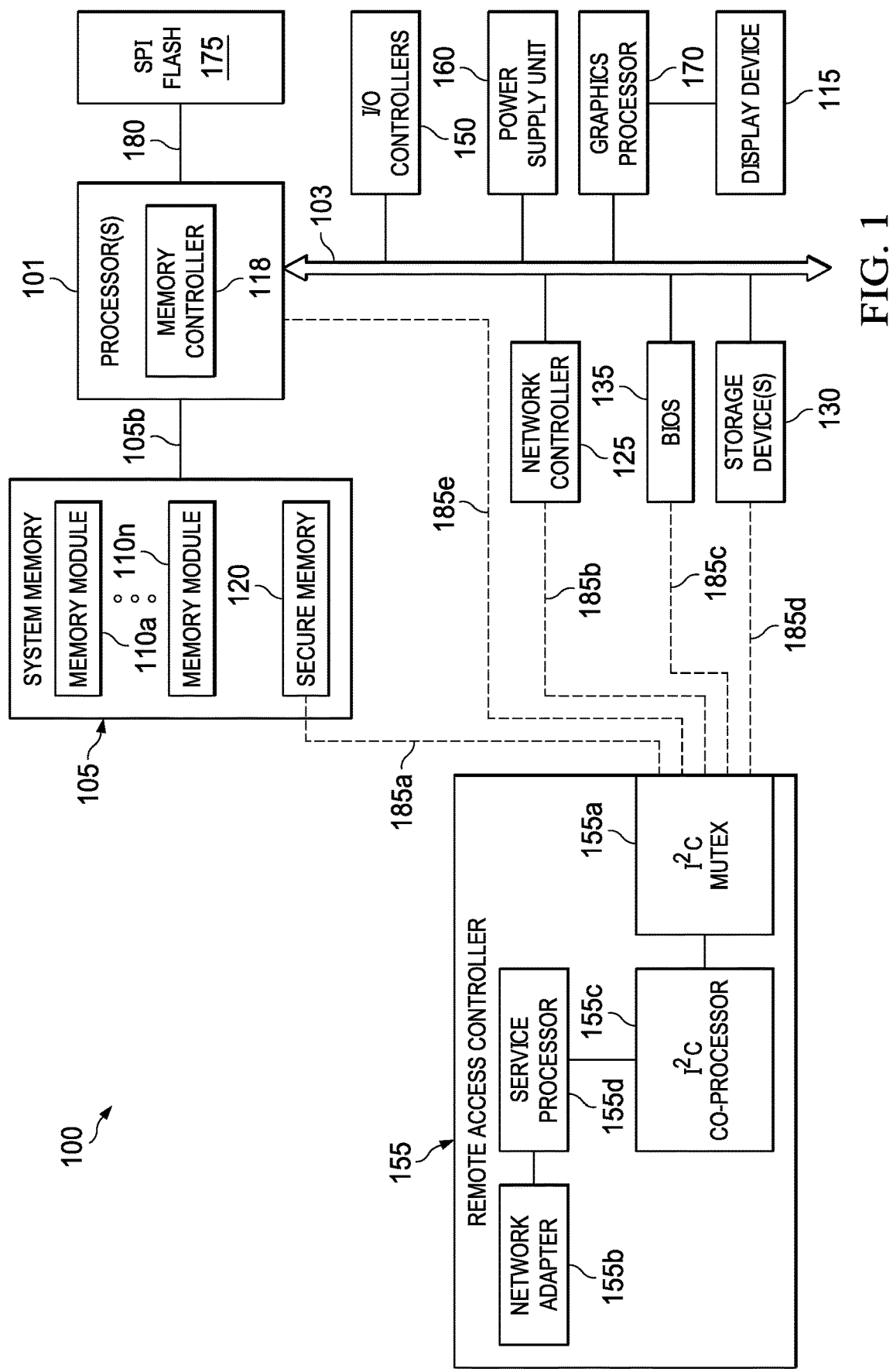
FIG. 1 is a diagram depicting certain components of an illustrative IHS that is operable according to various embodiments to estimate energy usage of workspaces used in virtualized environments.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, other embodiments may utilize various other types of IHSs.

FIG. 1 is a diagram depicting certain components of an illustrative IHS 100 that is operable according to various embodiments to estimate energy usage of workspaces used in virtualized environments. In some embodiments, IHS 100 may be employed to instantiate, manage, and/or terminate a secure workspace that may provide the user of IHS 100 with access to protected data in an isolated software environment in which the protected data is segregated from: the operating system (OS) of the IHS 100, other applications executed by IHS 100, other workspaces operating on IHS 100 and, to a certain extent, the hardware of the IHS. In some embodiments, the construction of a workspace for a particular purpose and for use in a particular context may be orchestrated remotely from the IHS 100 by a workspace orchestration service, such as described with regard to FIG. 2. In some embodiments, portions of the workspace orchestration may be performed locally on IHS 100. IHS 100 may be configured with program instructions that, upon execution, cause IHS 100 to perform one or more of the various operations disclosed herein. In some embodiments, IHS 100 may be an element of a larger enterprise system that may include any number of similarly configured IHSs in network communications with each other.

As shown in FIG. 1, IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or that may be configured to support specialized processing functions. Processor 101 may include any processor capable of executing program instructions, such as an Intel Pentium™ series processor or any general-purpose or embedded processors implementing any of a variety of Instruction Set Architectures (ISAs). In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 105*b*.

System memory 105 that is coupled to processor(s) 101 via memory bus 105*b* provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory. In certain embodiments, system memory 105 includes secure memory 120 that may be a portion of the system memory designated for storage of information, such as access policies, component signatures, encryption keys, and other cryptographic information, for use in hosting a secure workspace on IHS 100. In such embodiments, a signature may be calculated based on the contents of secure storage 120 and stored as a reference signature. The integrity of the data stored in secure storage 120 may then be validated at a later time by recalculating this signature of the contents of the secure storage and comparing the recalculated signature against the reference signature.

IHS 100 utilizes chipset 103 that may include one or more integrated circuits that are coupled to processor(s) 101. In the embodiment of FIG. 1, chipset 103 is depicted as a set of busses that couple processor 101 to various hardware components installed in the same motherboard. In some embodiments, all or portions of chipset 103 may be implemented directly within the integrated circuitry of processor(s) 101. Chipset 103 thus provides processor(s) 101 with access to a variety of hardware resources. In IHS 100, chipset 103 is illustrated as a single coupling with processor 101. However, other implementations may utilize any number of connections to provide the illustrated communication pathways supported by chipset 103. In some instances, capabilities supported by processor 101 are not directly available to workspaces operating on IHS 100 due to the isolation of these workspaces from certain hardware and software of the IHS.

In certain embodiments, IHS 100 may include a SPI (Serial Peripheral Interface) flash device 175 that stores certain data and instructions utilized by processor 101. The SPI flash 175 may be a non-volatile memory device capable of being electrically erased and reprogrammed. SPI flash 175 may be coupled to processor 101 over an SPI bus 180 that supports transfers of blocks of data to and from SPI flash 175. In some embodiments, SPI flash 175 may be divided into various regions, with each region storing different types of instructions and/or data. In certain embodiments, some of the regions of SPI flash 175 may be provisioned during trusted manufacture of IHS 100, such as with boot code, cryptographic keys, firmware reference signatures, and tokens that are used to implement security protocols utilized by IHS 100.

As illustrated, processor(s) 101 may also be coupled to a network controller 125, such as provided by a Network Interface Controller (NIC) that is coupled to the IHS 100 and allows the IHS 100 to communicate with other systems, such as other IHSs similarly configured to IHS 100, via an external network, such as the Internet or a LAN. Network controller 125 may provide IHS 100 with wired and/or wireless network connections via a variety of network technologies, such as wireless cellular or mobile networks (CDMA, TDMA, LTE etc.), WIFI and BLUETOOTH. In some embodiments, network controller 125 may be instrumented with a controller or other logic unit that supports a sideband management connection 185b with remote access controller 155. In some instances, capabilities supported by network controller 125 are not directly available to workspaces operating on IHS 100 due to the isolation of these workspaces from certain hardware and software of the IHS.

Chipset 103 may also support communications with one or more display device(s) 115 via graphics processor 170. In certain embodiments, graphics processor 170 may be comprised within one or more video or graphics cards or an embedded controller installed as components of the IHS 100. Graphics processor 170 may generate display information and provide the generated information to one or more display device(s) 115 coupled to IHS 100, where display device(s) 115 may include integrated display devices and/or external display devices coupled to IHS. In certain embodiments, some or all of the functions supported by graphics processor 170 may be integrated within processor 101. The one or more display devices 115 coupled to IHS 100 may utilize LCD, LED, OLED, or other thin film display technologies. Each display device 115 may be capable of touch input such as via a touch controller that may be a component of display device 115, graphics processor 170, or a separate component of IHS 100 accessed via bus 103. In some instances, capabilities supported by graphics processor 170 are not directly available to workspaces operating on IHS 100 due to the isolation of these workspaces from certain hardware and software of the IHS.

In certain embodiments, chipset 103 may utilize one or more I/O controllers 150 to access various I/O hardware components such as user input devices and sensors. For instance, I/O controllers 150 may provide access to user-input devices such as a keyboard, mouse, touchpad, touchscreen and/or other peripheral input devices. User input devices may interface with a I/O controller 150 through wired or wireless connections. Sensors accessed via I/O controllers 150 may provide access to data describing environmental and operating conditions of IHS 100 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, etc.). In some instances, sensor capabilities supported are not directly available to workspaces operating on IHS 100 due to the isolation of these workspaces from certain hardware and software of the IHS.

In some embodiments, the data inputs collected by such sensors may be received by sensor hub capable of utilizing this information in determining various physical characteristics of the location and manner in which IHS 100 is being utilized. For instance, the sensor hub may utilize inertial movement sensors, which may include accelerometer, gyroscope, and magnetometer sensors, and are capable of determining the current orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, the sensor hub may also include capabilities for determining a location and movement of IHS 100 based on triangulation of network signal and based on network information provided by the OS or by a network interface. In some embodiments, the sensor hub may support additional sensors, such as optical, infrared and sonar sensors, which may provide support for xR (virtual, augmented, and/or mixed reality) sessions hosted by the IHS 100 and may be used by the sensor hub provide an indication of a user's presence near IHS 100, such as whether a user is present, absent, and/or facing the integrated display device 115.

Chipset 103 also provides processor(s) 101 with access to one or more storage devices 130. In various embodiments, a storage device 130 may be integral to the IHS 100, or may be external to the IHS 100. In certain embodiments, storage device 130 may be accessed via a storage controller that may be an integrated component of the storage device. Storage device 130 may be implemented using any memory technology allowing IHS 100 to store and retrieve data. For instance, storage device 130 may be a magnetic hard disk storage drive or a solid-state storage drive. In some embodiments, storage device 130 may be a system of storage devices, such as a cloud drive accessible via network controller 125. In some embodiments, storage device 130 may be instrumented with a controller or other logic unit that supports a sideband management connection 185d with remote access controller 155. In some instances, data storage capabilities supported by storage devices 130 are not directly available to workspaces operating on IHS 100 due to the isolation of these workspaces from certain hardware and software of the IHS.

IHS 100 may also include a BIOS (Basic Input/Output System) 135 component that may include instructions stored in a non-volatile memory that may be accessible by processor 101. The BIOS 135 provides an abstraction layer that allows an operating system of the IHS 100 to interface with the hardware components of the IHS 100. Accordingly, BIOS 135 provides an abstraction layer to the firmware utilized by various hardware components of IHS 100. In some embodiments, BIOS 135 may be implemented using a dedicated microcontroller coupled to the motherboard of IHS 100. In some embodiments, some or all of BIOS 135 may be implemented as operations of an embedded controller, such remote access controller 155. Upon powering or restarting IHS 100, processor(s) 101 may utilize BIOS 135 to initialize and test various hardware components of the IHS 100. Upon successful validation of these hardware components, in some embodiments, BIOS 135 may also initiate loading of an operating system for use by the IHS 100. As illustrated, BIOS 135 may be instrumented with a controller or other logic unit that supports a sideband management connection 185c with remote access controller 155. In certain embodiments, this sideband management connection 185c may be utilized by remote access controller 155 to identify communication capabilities that are supported by IHS 100 and that may be used in support of secure communications by workspaces operating on IHS 100.

As illustrated, IHS 100 may also include a power supply unit 160 that provides the hardware components of IHS 100 with appropriate levels of DC power. Power inputs received via a power port or via USB ports may be routed to the power supply unit 160 of IHS 100. The power inputs received by power supply unit 160 may be used in powering the operations of IHS 100 and in recharging internal batteries of IHS 100. In some embodiments, power supply unit 160 may support power outputs drawn from the internal batteries of IHS 100 and provided to external devices coupled to IHS 100, such as USB devices coupled to USB ports of IHS 100. In some embodiments, power supply unit 160 may provide power to components of IHS 100 using multiple independent power planes. For instance, as described below, remote access controller 155 may be powered from a separate power plane from processor 101.

As illustrated, IHS 100 includes a remote access controller (RAC) 155 that provides capabilities for remote monitoring and management of various aspects of the operation of IHS 100. In support of these monitoring and management functions, remote access controller 155 may utilize both in-band and sideband (i.e., out-of-band) communications with various internal components of IHS 100. Remote access controller 155 may be installed on the motherboard of IHS 100 or may be coupled to IHS 100 via an expansion slot provided by the motherboard. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 155 may operate from a different power plane from processors 101, storage devices 130, network controller 125 and various other components of IHS 100, thus allowing the remote access controller 155 to operate, and management tasks to proceed, while the processing cores of IHS 100 are powered off. In some embodiments, various BIOS functions, including launching the operating system of the IHS 100, may be implemented by the remote access controller 155. In some embodiments, the remote access controller 155 may perform various functions to verify the integrity of the IHS 100 and its hardware components prior to initialization of the IHS 100 (i.e., in a bare-metal state).

In some embodiments, remote access controller 155 may support monitoring and administration of various managed devices 101, 120, 125, 130, 135 of an IHS via a sideband bus interface. For instance, messages utilized in device management may be transmitted using I2C sideband bus connections 185a-e that may be individually established with each of the respective managed devices 120, 125, 135, 130, 101 through the operation of an I2C multiplexer 155a of the remote access controller. As illustrated, managed devices 125, 130, 135 of IHS 100 are coupled to the IHS processor (s) 101 via one or more in-band buses supported by chipset 103, where these in-band busses are separate from the I2C sideband bus connections 185b-d used for device management. Accordingly, managed devices 125, 130 and 135 communicate with the operating system of IHS 100 via in-band buses supported by chipset 103, while the sideband buses 185b-d are used by managed devices exclusively for communications with remote access controller 155.

In certain embodiments, a service processor 155d of remote access controller 155 may rely on an I2C co-processor 155c to implement sideband I2C communications between the remote access controller 155 and managed components 101, 120, 125, 130, 135 of the IHS. The I2C co-processor 155c may be a specialized co-processor or micro-controller that is configured to interface via a sideband I2C bus interface with the managed hardware components 101, 120, 125, 130, 135 of IHS. In some embodiments, the I2C co-processor 155c may be an integrated component of the service processor 155d, such as a peripheral system-on-chip feature that may be provided by the service processor 155d. Each I2C bus 185a-e is illustrated as single line in FIG. 1. However, each I2C bus 185a-e may be comprised of a clock line and data line that couple the remote access controller 155 to I2C endpoints 101, 120, 125, 130, 135 on each of the managed components.

As illustrated, the I2C co-processor 155c may interface with the individual managed devices 101, 120, 125, 130, 135 via individual sideband I2C buses 185a-e selected through the operation of an I2C multiplexer 155a. Via switching operations by the I2C multiplexer 155a, a sideband bus connection 185a-e may be established through a direct coupling between the I2C co-processor 155c and each of the individual managed devices 101, 120, 125, 130, 135. In providing sideband management capabilities, the I2C co-processor 155c may interoperate with corresponding endpoint I2C controllers that implement the I2C communications of the respective managed devices 101, 120, 125, 130, 135. The endpoint I2C controllers may be implemented as dedicated microcontrollers for communicating sideband I2C messages with the remote access controller 155, or endpoint I2C controllers may be integrated SoC functions of a processor of the respective managed device endpoints 101, 120, 125, 130, 135.

In some embodiments, remote access controller 155 may perform various operations in support of the delivery and deployment of workspaces to IHS 100. In certain embodiments, remote access controller 155 may interoperate with a remote orchestration service via the described out-of-band communications pathways that are isolated from the operating system that runs on IHS 100. In some embodiments, a network adapter 155b that is distinct from network controller 125 utilized by the operating system of IHS 100 may support such out-of-band communications between remote access controller 155 and a remote orchestration service. Via this out-of-band signaling pathway, remote access controller 155 may receive authorization information that may be used for secure delivery and deployment of a workspace to IHS 100 and to support secure communication channels between deployed workspaces and various capabilities supported by IHS 100, while still maintaining isolation of the workspaces from the hardware and operating system of IHs 100.

In some embodiments, authorization and cryptographic information received by remote access controller 155 from a remote orchestration service may be stored to secured memory 120. As illustrated in FIG. 1, in some embodiments, remote access controller 155 may access secured memory 120 via an I2C sideband signaling pathway 185*a* between I2C multiplexer 155*a* and an I2C communication capability supported by secure memory 120. Remote access controller 155 may support execution of a trusted operating environment that supports secure operations that are used to deploy a workspace on IHS 100. In certain embodiments, remote access controller 155 may calculate signatures that uniquely identify various hardware and software components of IHS 100. For instance, remote access controller 155 may calculate hash values based on instructions and other information used to configure and operate hardware and/or software components of IHS 100. For instance, remote access controller 155 may calculate a hash value based on firmware and on other instructions or settings of a component of a hardware component. In some embodiments, hash values may be calculated in this manner as part of a trusted manufacturing process of IHS 100 and may be stored in the secure memory 120 as reference signatures used to validate the integrity of these components at a later time. In certain embodiments, a remote orchestration service supporting the deployment of workspaces to IHS 100 may verify the integrity of the remote access controller 155 in a similar manner, by calculating a signature of remote access controller 155 and comparing it to a reference signature calculated during a trusted process for manufacture of IHS 100.

In some embodiments, an IHS 100 may not include all of the components shown in FIG. 1. In other embodiments, an IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as systems-on-a-chip.

Figure 2:
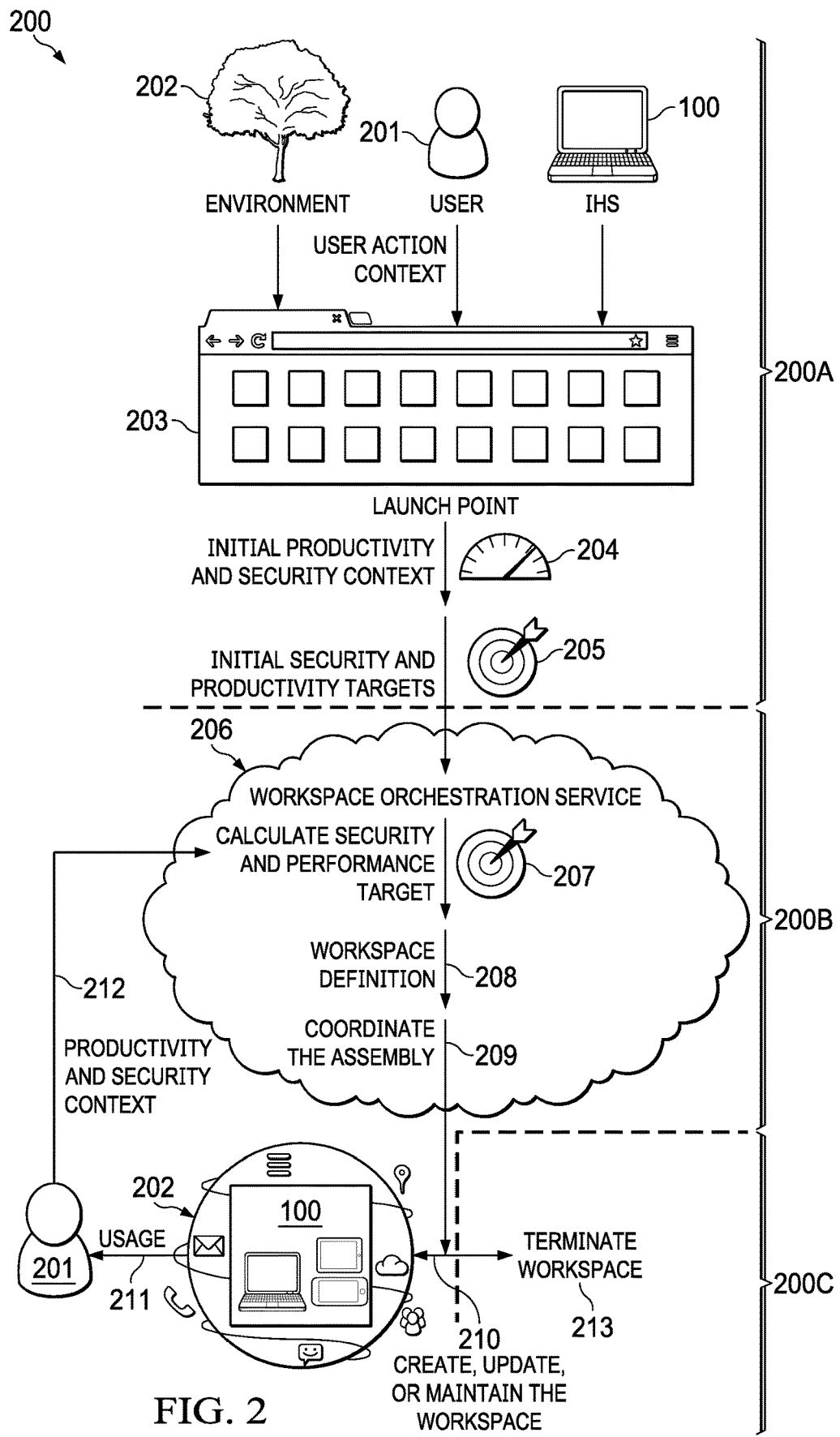
FIG. 2 is a diagram depicting illustrative embodiments of methods and system for deployment and management of workspaces on an IHS in a manner that supports estimating an amount of energy used by those workspaces according to one embodiment of the present disclosure.

FIG. 2 is a diagram depicting illustrative embodiments of methods and system for deployment and management of workspaces on an IHS in a manner that supports estimating an amount of energy used by those workspaces according to one embodiment of the present disclosure. For sake of explanation, the workspace lifecycle supported by embodiments has been split into three phases: workspace initialization phase 200A, workspace orchestration phase 200B, and workspace termination phase 200C. During initialization 200A, user 201 operates an IHS 100, such as described with regard to FIG. 1, within a physical environment 202 (e.g., any type of environment and its associated context, including physical location, geographic location, location within a particular facility or building, detected networks, time of day, proximity of the user, individuals in the vicinity of IHS 100, etc.).

The illustrated method for the workspace lifecycle according to embodiments may be initiated with an action by user 201 at a user interface that serves as a launch point 203 for initiating a workspace. In various instances, launch point 203 may be a corporate launch point provided by an employer of user 201, a manufacturer launch point provided by the manufacturer of IHS 100, or a third-party launch point provided as a service to user 201 by a third-party. In various instances, user 201 may operate IHS 100 to access a launch point 203 that is provided in the form of a web portal, a portal application running in the operating system of IHS 100, or a special-purpose portal workspace operating on IHS 100. In various embodiments, launch point 203 may be implemented using graphical, textual and/or audio interfaces by which data or other resource may be requested by a user 201. In various implementations, launch point 203 may include Graphical User Interface (GUI) elements, such as icons, which represent different software applications, data sources and/or other resources that the user may select for use via a workspace. As such, launch point 203 may provide a user with an ability to request initiation of a workspace that processes access to software applications and data sources that are available to the user 201.

As described in additional detail below, workspaces for providing user 201 with access to protected data or other resources may operate using a local management agent that operates on IHS 100 and is configured to interoperate with workspace orchestration service 206. As described, launch point 203 may be provided in the form of a portal (e.g., a webpage, OS application or special purpose workspace) that includes a user interface that allows user 201 to request access to managed resources. In some embodiments, launch point 203 may be hosted by the local management agent that runs on IHS 100 and interoperates with remote workspace orchestration service 206. Examples of launch point 203 technologies may include WORKSPACE ONE INTELLIGENT HUB from WMWARE, INC., and DELL HYBRID CLIENT from DELL TECHNOLOGIES INC., among others.

Initialization phase 200A begins when user 201 chooses to launch an application or access a data source that is managed by the workspace orchestration service 206. In response to an access request issued by user 201 (e.g., the user "clicks" on an icon presented by launch point 203), at 204, local management agent of IHS 100 collects initial security context information and productivity context information. In various embodiments, the security context information of a workspace may include attributes indicating a security risk associated with: the data and/or application being requested, a level of risk presented by the user 201, the hardware of the IHS 100, the logical software environment of IHS 100 in which a workspace will be deployed, and the physical environment 202 in which IHS 100 is currently located. Accordingly, in this disclosure, a "security context" generally refers to data or other information related to a security posture in which a workspace will be deployed and utilized, where the security posture may be based on characteristics of user 201, IHS 100, the data and/or application to be accessed via the workspace, and/or environment 202. In some embodiments, a security context may be quantified as a security risk score in support of evaluations of the level or risk associated with providing user 201 access to requested data and/or application while using IHS 100 in the particular context.

In this disclosure, "workspace definition" generally refers to a collection of attributes that describe aspects a workspace that is assembled, initialized, deployed and operated in a manner that satisfies a security target (e.g., the definition presents an attack surface that presents an acceptable level of risk) and a productivity target (e.g., the definition provides a requisite level of access to data and applications with an upper limit on latency of the workspace) in light of the security context (e.g., location, patch level, threat information, network connectivity, etc.) and the productivity context (e.g., performance characteristics of the IHS 100, network speed, workspace responsiveness and latency) in which the workspace is to be deployed. A workspace definition may enable fluidity of migration of an instantiated workspace, since the definition supports the ability for a workspace to be assembled on any IHS 100 that is configured for operation with the workspace orchestration service 206.

In specifying capabilities and constraints of a workspace, a workspace definition 208 may prescribe one or more of: authentication requirements for user 201, types of containment and/or isolation of the workspace (e.g., local application, sandbox, docker container, progressive web application (PWA), Virtual Desktop Infrastructure (VDI)), applications that can be executed in the defined containment of the workspace with access to one or more data sources, security components that reduce the scope of the security target presented by the productivity environment (e.g., DELL DATA GUARDIAN from DELL TECHNOLOGIES INC., anti-virus software), the data sources to be accessed and requirements for routing that data to and from the workspace containment (e.g., use of VPN, minimum encryption strength), and workspace capabilities available to independently attach other resources.

In some implementations, workspace definitions may be based at least in part on static policies or rules defined, for example, by an enterprise's Information Technology (IT) personnel. In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then workspace orchestration service 206 may autonomously add that application to the default workspace definition for that user.

Still with respect to FIG. 2, during an orchestration phase 200B of workspace deployment, at 208, the initial security and productivity targets are processed and/or reconciled against resources, IHS capabilities, and cloud services capabilities in order to produce a workspace definition. As described, a workspace definition may specify capabilities and constraints of a workspace, such as: runtime security requirements of the workspace containment (e.g., such as isolation from the OS of IHS 100 or from certain hardware of IHS 100), the use of reference measurements to attest to the integrity of the workspace, applications to be provided for operation within the workspace, aggregation of resources available via the workspace, configurations for accessing data or resources (e.g., required use of a virtual private network (VPN)).

Figure 3:
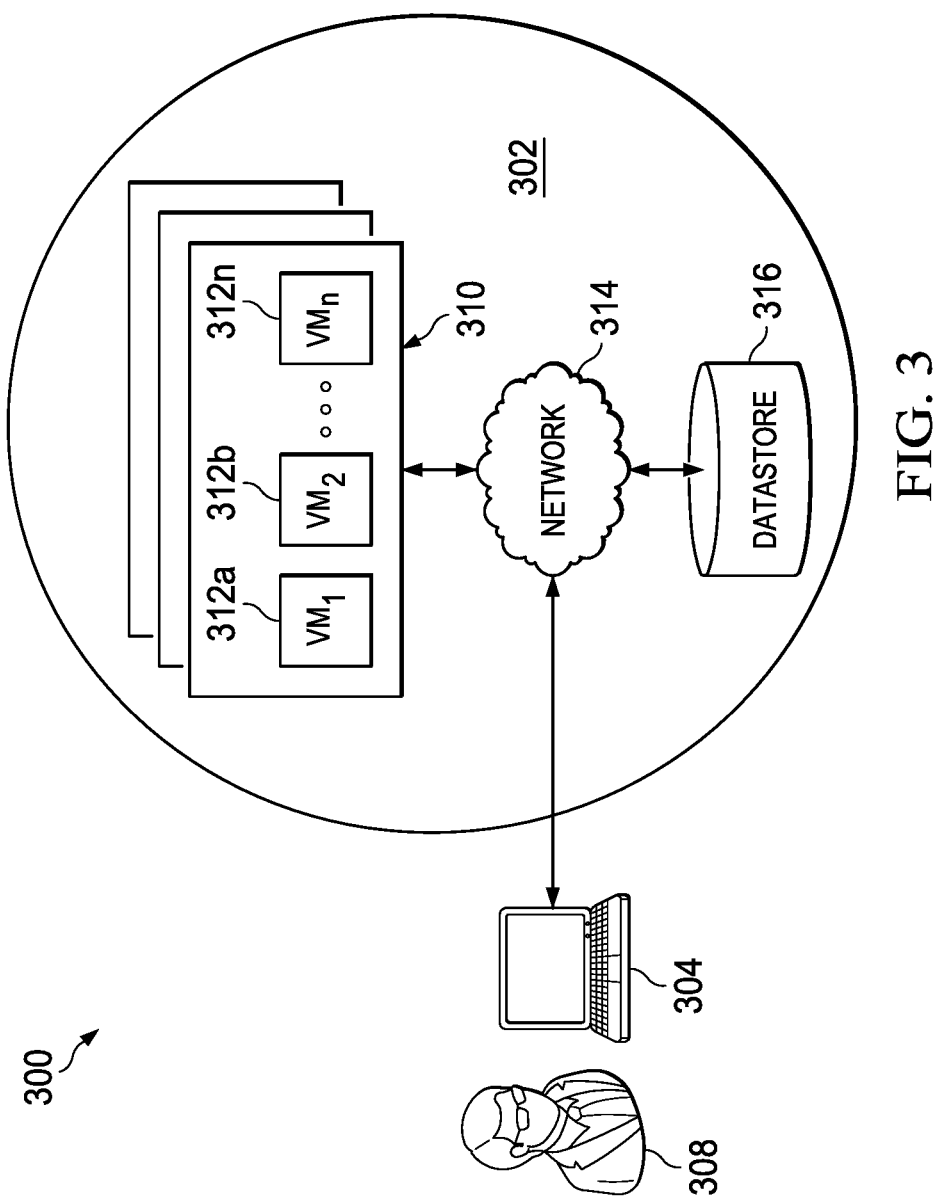
FIG. 3 illustrates an example workspace energy usage estimation system that may be implemented on a computing environment for estimating each usage for individual applications and/or containers in a virtualized computing environment according to one embodiment of the present disclosure.

As described in additional detail with regard to FIG. 3, the initial workspace definition may then be utilized by an automation engine 302 of workspace orchestration service 206 to coordinate the assembly 209 and instantiation 210 of a workspace on an appropriate platform (e.g., on the cloud, on IHS 201, or some combination of the two) based on the security and productivity contexts in which the workspace will operate. In some embodiments, automation engine 302 may resolve configuration conflicts between a workspace definition and the user's inputs in the operation of a workspace. In cases where a workspace is cloud-hosted, the automation engine 302 may assemble and instantiate a remote workspace that may be accessed via a secure connection established via a web browser or other web-based component operating on the IHS 100.

At 211 of FIG. 2, the instantiated workspace is operated by user 201 and new productivity and security context information related to the behavior or use of data is generated at 212. This operation of a workspace may result in a change or new classification of data based upon what user 201 has done, accessed, and/or created, thus resulting in a change to the security context of the workspace. To the extent the user's behavioral analytics, device telemetry, and/or the environment has changed to a quantifiable degree, these changes in security context may serve as additional input for a reevaluation, at 207, of the security and performance targets by automation engine 302. Additionally or alternatively, a new workspace context, security target, and/or productivity target may be now measured against the initial targets, and the result may cause automation engine 302 to produce a new workspace definition at 208.

Particularly, if the instantiated workspace(s) have security or productivity parameters that fall outside of a range of the target scores for these parameters such that a difference between an updated context information and the previous context information is scored below a threshold value, automation engine 302 may generate modifications to an existing workspace and, at 210, may deploy an updated workspace according to the modified definition. Conversely, if the difference between an updated context information and the previous context information is scored above a threshold value, automation engine 302 may generate a new workspace at 210. Session data metadata and context may be preserved by a data aggregation engine, and session data may be restored in the new workspace as applicable.

Various conditions may trigger termination of a workspace at 213, as part of termination phase 200C. In some cases, user action may initiate the termination of a workspace (e.g., user 201 closes application or browser accessing data). In other cases, termination of a workspace may take place automatically as part of an adjustment in workspace definition (e.g., the workspace is terminated by automation engine 302 in order to support a new or updated workspace). As part of a termination phase 200C of a workspace, various workspace resources of IHS 100 and/or at workspace orchestration service 206 may be released.

FIG. 3 illustrates an example workspace energy usage estimation system 300 that may be implemented on a computing environment 302 for estimating each usage for individual applications and/or containers in a virtualized computing environment according to one embodiment of the present disclosure. The energy usage estimation system 300 includes a computing environment 302 that is managed by a systems management appliance 304. As shown, the systems management appliance 304 communicates with the computing environment 302 through a communication network 314. Nevertheless, it should be appreciated that the systems management appliance 304 may communicate locally with the computing environment 302, or form a part of the computing environment 302.

In general, the systems management appliance 304 is configured to monitor and control any number of computing devices in the computing environment 302 by a user 308. In one embodiment, the systems management appliance 304 provides at least a portion of the features of a systems management console. For the purposes of this disclosure, term "system management console" may refer broadly to systems that are configured to couple to a management controller and issue management instructions for an information handling system (e.g., computing device) that is being managed by the systems management appliance 304. One example of such a system management console is the Dell OpenManage Enterprise (OME) systems management console. In various embodiments, management consoles may be implemented via specialized hardware and/or via software running on a standard information handling system. In one embodiment, a system management console may be deployed on a secure virtual machine (VM), such as a VMWARE Workstation appliance. According to embodiments of the present disclosure, certain features described herein may be provided by instructions stored a memory and executed by at least one processor in the systems management appliance 304.

The computing environment 302 includes one or more hosts 310 that are each configured with one or more virtual machines (VMs) 312a-n. Although the present embodiment is described in terms of hosts 310 that each executes one or more VMs 312a-n, it should be appreciated that the features of the present disclosure may be applied to any workspace, such as software-based (e.g., Docker, Snap, etc.) or hardware-based (Intel Clear Container, Hyper-V docker, etc.) workspace. The hosts 310 may include any type and quantity of computing devices, such as those that may be included in a computing cluster, a data center, or multiple computing devices of an organizational entity, such as a business, or school. In one embodiment, certain computing devices of the computing environment 302 may be similar in design and construction to the IHS 100 as described above with reference to FIG. 1.

The computing environment 302 also includes a communication network 314 that enables communication of VMs 312a-n with a datastore 316. The datastore 316 provides for storage of data used by VMs 312a-n. Examples of such datastores 316 may include, for example, a storage area network (SAN), an Internet Small Computer System Interface (iSCSI) storage device, a network attached storage (NAS) device, and others.

Embodiments of the present disclosure determine a proportionate share of power consumed by a VM 312a-n executing on its host 310 by obtaining metrics relating to its operation. Metrics relating to operation of the host 310 may be stored in and accessible to the systems management appliance 304. Additionally, metrics relating to server resource utilization attributable to the VM 312a-n may be obtained and stored. For example, the systems management appliance 304 may be configured to receive metrics regarding a proportionate amount (e.g., the percentage) of a physical CPU and non-volatile memory (e.g., RAM) utilization consumed by a VM 312a-n from a virtual machine platform (e.g., Vsphere virtualization platform available from VMware), and store the information. Given this information, the CPU power consumption attributable to each particular VM 312a-n can be calculated by the system 300 as a proportion of the CPU utilization. Such information may be stored at ongoing intervals (e.g., once every minute) to create a power consumption history that can be used to calculate overall energy consumption by a particular VM 312a-n over a period of time for use in, for example, charge-back. For other components, such as network devices configured in network 314 and datastores 316, their energy consumed by network device may be distributed among the VMs 312a-n proportionately according to their respective network and storage usage utilization, respectively.

Figure 4:
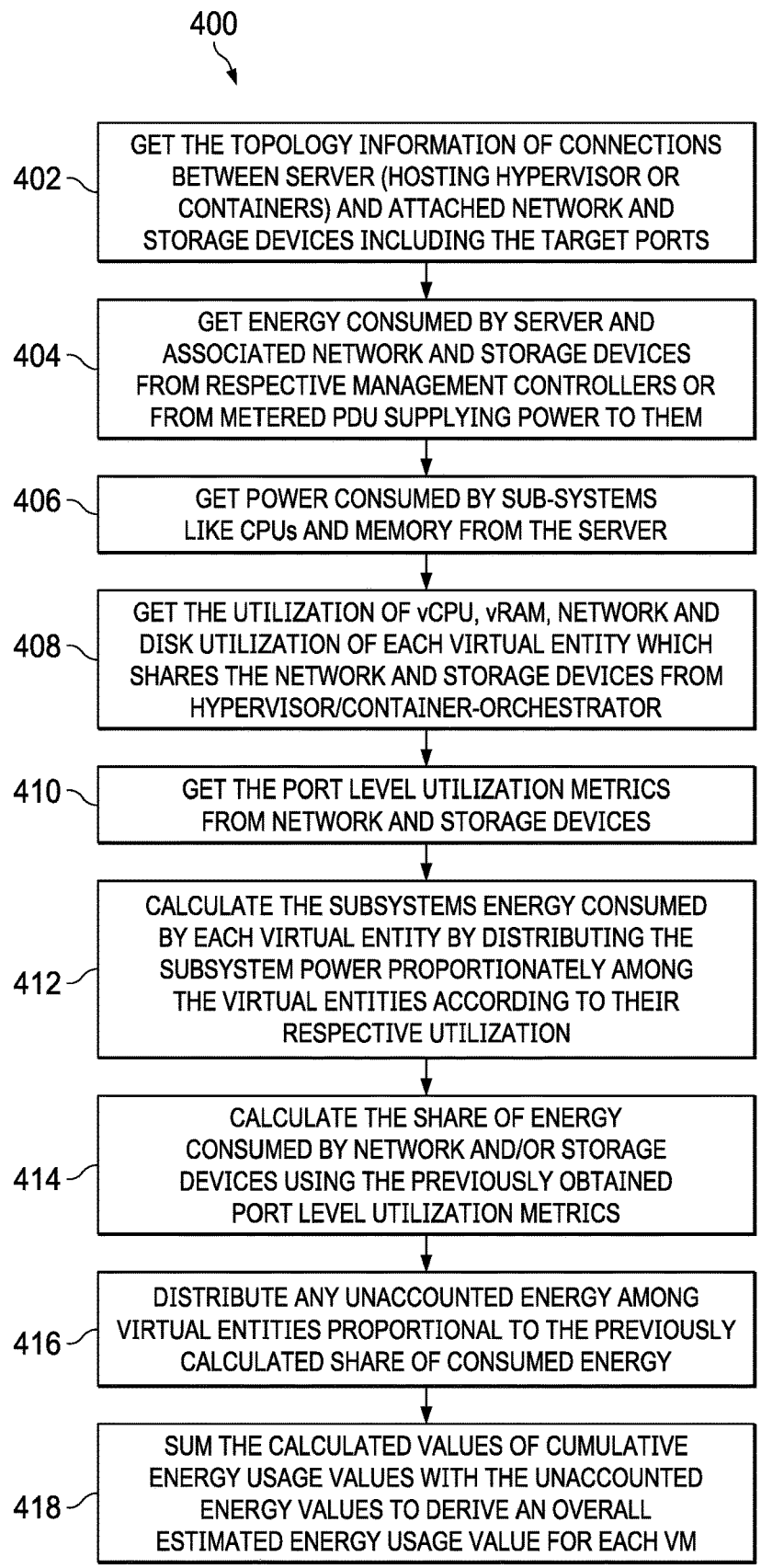
FIG. 4 is a flowchart depicting certain steps of one embodiment of a workspace energy usage estimation method according to one embodiment of the present disclosure.

FIG. 4 is a flowchart depicting certain steps of one embodiment of a workspace energy usage estimation method 400 according to one embodiment of the present disclosure. In one embodiment, at least a portion of the steps of the method 400 may be performed by the systems management appliance 304 on a target IHS, such as IHS 100. In another embodiment, the method 400 may be performed by any suitable IHS independently of any systems manager appliance 304. Initially, each of multiple VMs may be placed in service in that they have been configured with certain end-use applications, are coupled to a communications network, and booted to commence their operation.

Figure 5A:
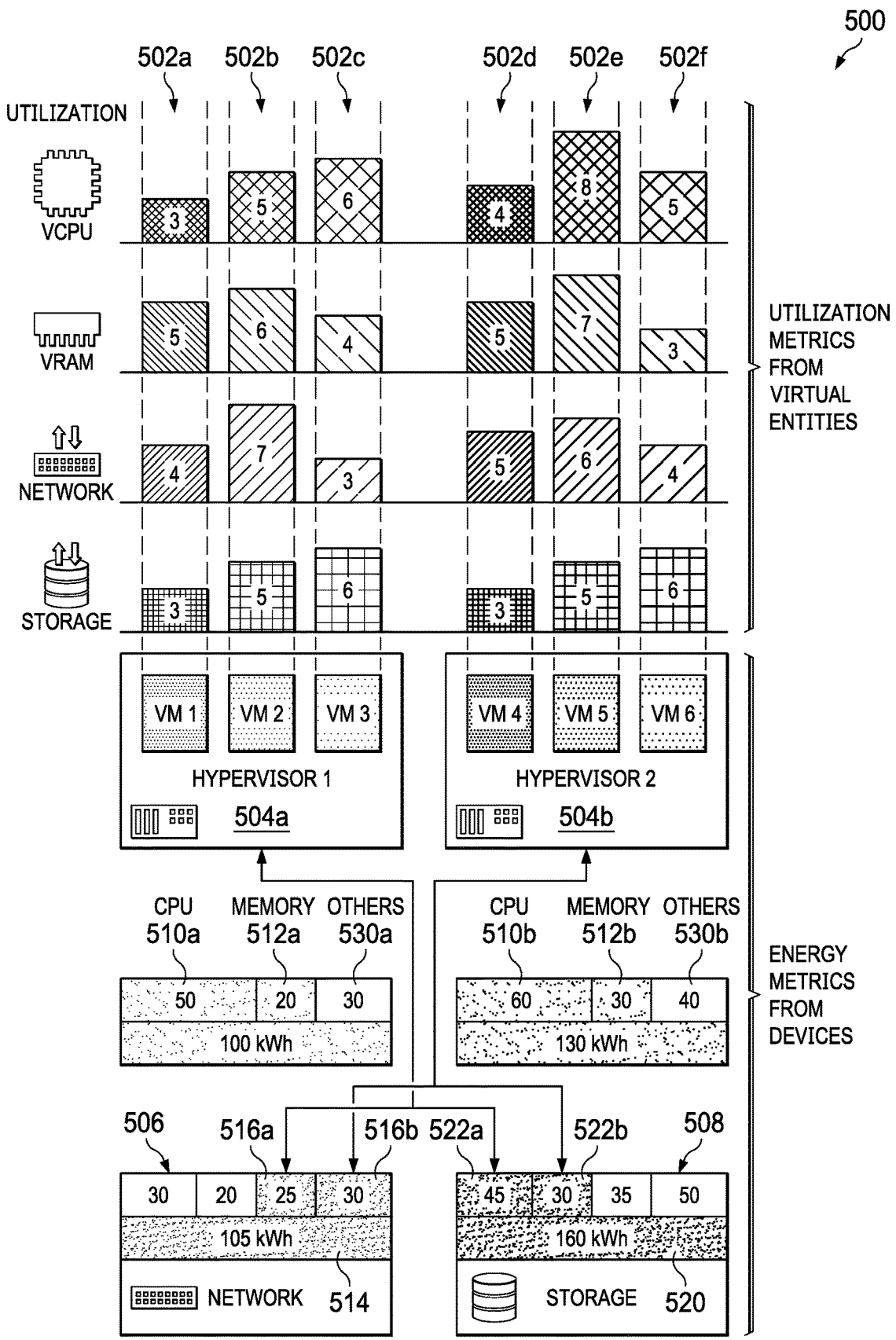

To provide a specific example, FIGS. 5A through 5D illustrate an example energy usage estimation scenario 500 showing how energy usage may be estimated for each of six VMs 502a-f executed on two hosts 504a-b. It should be appreciated that, although the scenario of FIGS. 5A-5B shows two hosts 504a-b that each execute three VMs 502a-f, other scenarios may include any number of hosts that each host any desired number of VMs. The features of the workspace energy usage estimation scenario 500 will be discussed in conjunction with the steps of the method 400 described herein.

At step 402, the method 400 obtains topology information of network connections configured between nodes of a computing environment, and its network devices and storage devices. Given the example scenario 500 of FIGS. 5A-5B, the method 400 may obtain topology information for connections established between the nodes (e.g., hosts 504a-b and VMs 502a-f) and attached network devices 506 and storage devices 508 of the computing environment 500. Thereafter at step 404, the method 400 obtains information associated with an amount of energy consumed by the hosts along with any network devices, and storage devices associated with the hosts. For example, the method 400 may obtain the consumed energy from the hosts 504a-b, network device 506, and storage device 508 by querying their respective management controller, or from a metered Power Distribution Unit (PDU) that powers such devices. (See FIG. 5A). In one embodiment, the method 400 may obtain power usage levels at ongoing intervals (e.g., once a minute) and average the obtained power usage levels over a period of time to determine the amount of energy used.

The method 400 may also obtain energy information associated with an amount of energy consumed by certain sub-systems, such as CPUs and Memory from the hosts 504a-b at step 406, and at step 408, obtain the utilization of vCPU, vRAM, network, and/or disk utilization of each VM 502a-f that shares the network device 506 and storage device 508. Returning to the example scenario 500 of FIGS. 5A-5D, the method 400 may obtain sub-system energy information from the hosts 504a-b at step 406, and obtain the utilization (i.e., workspace usage metrics) of vCPU, vRAM, network, and disk utilization of each VM 502a-f that shares the network device 506 and storage device 508 at step 408. In one embodiment, the method 400 may obtain the energy levels from the sub-systems by querying their respective management controller, or PDU, while obtaining vCPU, vRAM, network, and disk utilization from a workspace orchestration system (e.g., hypervisor) that manages the operation of the VMs 502a-f.

The method 400, at step 410, also obtains port level utilization metrics from network and storage devices. For example, the method 400 may obtains port level utilization metrics from the network device 506 and storage device 508 as shown in FIG. 5A. Port level utilization metrics may include, for example, usage levels of virtualized logical entities (e.g., vCPU, vRAM, network, storage, etc.) of each VM 502a-f. In one embodiment, the method 400 may obtain the logical entity's usage levels using a virtualization platform, such as the vSphere cloud computing virtualization platform provided by VMware.

As described herein above, step 402-410 are mostly performed to gather energy usage from various components of the computing environment that manages the VMs. Nevertheless, steps 412-418 may be performed by the method 400 to obtain an estimation of energy usage consumed by some, most, or all of the VMs in the computing environment.

At step 412, the method 400 calculates the subsystems energy consumed by each virtual entity by distributing the subsystem power proportionately among the virtual entities according to their respective utilization. That is, step 412 may be performed to assess a relative proportion of CPU and volatile storage used by each of the VMs in the computing environment.

Referring FIG. 5A, the relative amount of CPU utilization for each of VMs 502a-c is shown to be 3, 5, and 6 respectively, while that of VMs 502d-f are 4, 8, and 5 respectively. Additionally, the CPU utilization 510a of host 504a is shown to be 50.0 Kilo-Watt-Hours, while that of host 504b is shown to be 60.0 kilowatt-hours (kWh). Referring now to FIG. 5B, the CPU utilization of 50.0 kWh of host 504a is distributed according to the relative usage of VMs 502a-c (e.g., ratio of 3:5:6) to yield 10.7 kWh, 17.85 kWh, and 21.42 kWh for each of VMs 502a-c respectively. Additionally, the CPU utilization of 60.0 kWh of host 504a is distributed according to the relative usage of VMs 502d-f (e.g., ratio of 4:8:5) to yield 14.11 kWh, 28.23 kWh, and 17.64 for each of VMs 502d-f respectively.

The volatile storage energy used by each VM 502a-f may also be estimated. For example, the relative amount of volatile storage (e.g., RAM) utilization for each of VMs 502a-c is shown to be 5, 6, and 4, respectively, while that of VMs 502d-f are 5, 7, and 3 respectively. Additionally, the volatile storage utilization 512a of host 504a is shown to be 20.0 Kilo-Watt-Hours, while the volatile storage utilization 512b of host 504b is shown to be 30.0 kWh. Referring now to FIG. 5B, the volatile storage utilization of 20.0 kWh of host 504a is distributed according to the relative usage of VMs 502a-c (e.g., ratio of 5:6:4) to yield 6.0 kWh, 8.0 kWh, and 5.0 kWh for each of VMs 502a-c respectively. Additionally, the CPU utilization of 30.0 kWh of host 504b is distributed according to the relative usage of VMs 502d-f (e.g., ratio of 5:7:3) to yield 10.0 kWh, 14.0 kWh, and 6.0 kWh for each of VMs 502d-f respectively.

Referring again to FIG. 4, the method 400 calculates the share of energy consumed by network and/or storage devices using the previously obtained port level utilization metrics at step 414. This step may be performed to estimate a relative amount of energy incurred on the network 506 and non-volatile storage 508 components of the computing environment by each of the VMs in the computing environment.

Referring to FIG. 5A, the total amount of network component energy 514 is measured to be 105.0 kWh, while the relative amount of network utilization for VMs 502a-c is shown to be 25.0%, while that of VMs 502d-f are 30% utilization. Additionally, the relative network utilization for VMs 502a-c are shown to be at a ratio of 4:7:3, while that of VMs 502d-f are is shown to be at a ratio of 5:6:4. Referring now to FIG. 5B, the network utilization 514 of 105.0 kWh is distributed according to the relative usage of each host 504a and 504b at a ratio of 25:30, and according to a relative usage of each VM 502a-c at a ratio of 4:7:3, and VMs 502d-f at a ratio of 5:6:4 to yield estimated energy usage values of each VM 502a-f of 7.0 kWh, 12.5 kWh, 5.0 kWh, 10.0 kWh, 12.0 kWh, and 8.0 kWh respectively.

The energy consumed by the non-volatile storage may also be distributed among the VMs 502a-f. As shown in FIG. 5A, for example, the total amount of non-volatile storage component energy 520 is measured to be 160.0 kWh, while the relative amount of non-volatile storage utilization 522a for VMs 502a-c is shown to be 45.0%, while the relative amount of non-volatile storage utilization 522b for VMs 502d-f are 30% utilization. Additionally, the relative non-volatile storage utilization for VMs 502a-c are shown to be at a ratio of 3:5:6, while that of VMs 502d-f are is shown to be at a ratio of 3:5:6. Additionally, the non-volatile storage utilization 520 of 160.0 kWh is distributed according to the relative usage of each host 504a and 504b at a ratio of 45:30, and according to a relative usage of each VM 502a-c at a ratio of 3:5:6, and VMs 502d-f at a ratio of 3:5:6 to yield estimated non-volatile storage energy usage values of each VM 502a-f of 9.6 kWh, 16.07 kWh, 19.28 kWh, 6.0 kWh, 10.7 kWh, and 12.85 kWh respectively.

Referring again to FIG. 4, the method 400 distributes any unaccounted energy among virtual entities proportional to the previously calculated share of consumed energy at step 416. That is, the method 400 may distribute any residual values of energy not previously distributed across the VMs to conclusively estimate most or all of the energy that is consumed by their respective hosts. This step may be explained according to the example scenario 500 of FIGS. 5A-5D.

Figure 5C:
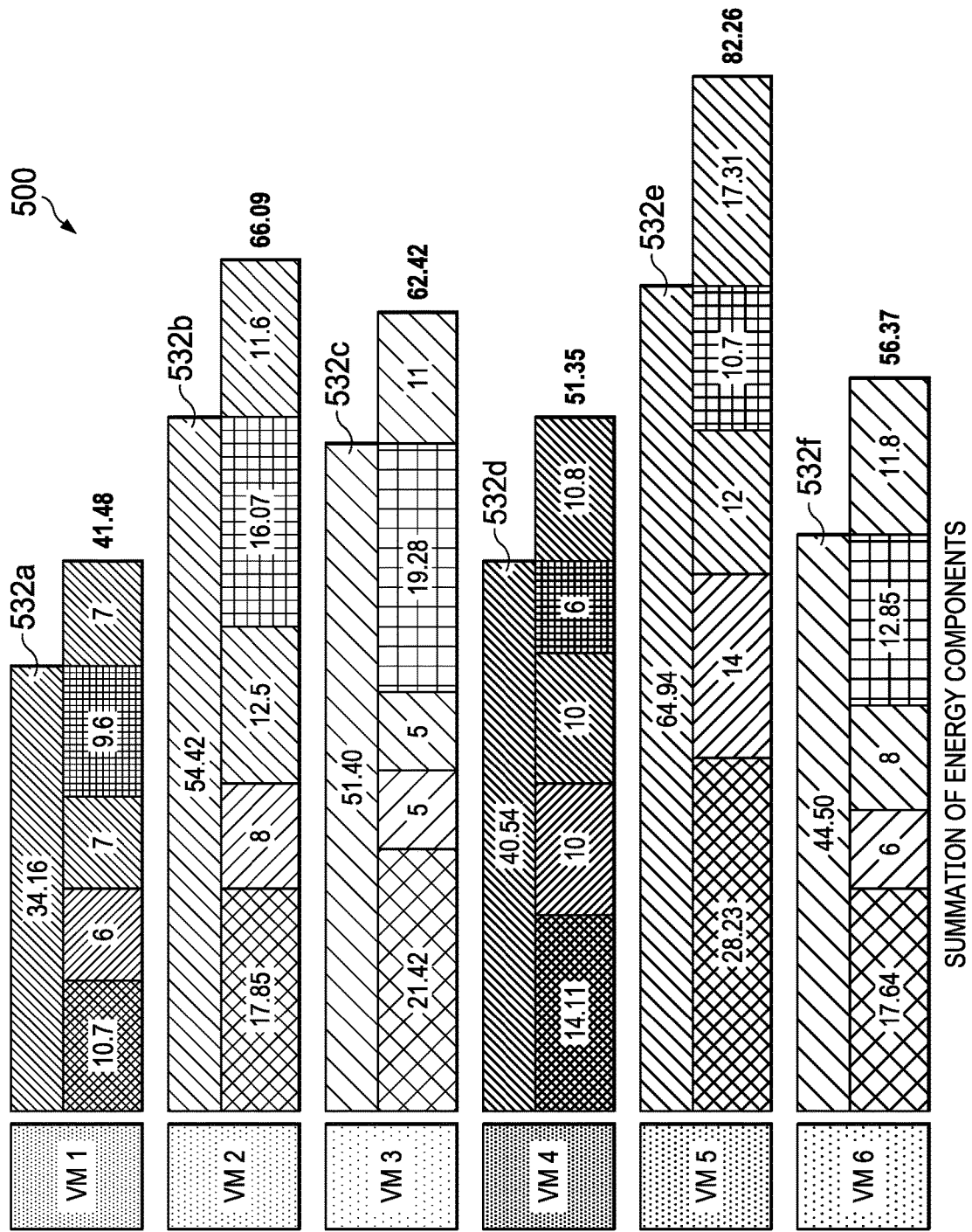

Referring to FIG. 5A through 5C, the unaccounted energy 530a used by the host 504a is shown to be 30.0 kWh, while that of the host 504b is shown to be 40.0 kWh. These values of energy usage may be distributed among each of the VMs 502a-f according to the previously accounted for energy levels consumed by each VM 502a-f.

As best shown in FIG. 5C, the method 400 may, for each VM 502a-f, calculate a cumulative accounted for energy usage values 532a-f for each VM 502a-f. VM 502a, for example, may be calculated to have a cumulative accounted for energy usage values 532a of 34.16 kWh, which is a summation of calculated CPU utilization value of 10.7 kWh, volatile utilization value of 6.0 kWh, a network utilization value of 7.0 kWh, and a non-volatile storage value of 9.6 kWh. Cumulative accounted for energy usage values 532b-f may also be calculated for the other VMs 502b-f.

As best shown in FIG. 5B, these cumulative accounted for energy usage values 532a-f may be used to distribute the unaccounted energy 530a-b consumed by each host 504a-b respectively. In particular, the accounted for energy usage values 532a-c may be used to distribute the unaccounted energy 530a of 30.0 kWh to each of the VMs 502a-c, which in this particular example scenario would be at a ratio of 34.16:54.42:51.40, thus yielding a distributed unaccounted energy values 534a-c of 7.0 kWh, 11.6 kWh, and 11.0 kWh respectively. Distributed unaccounted energy values 534d-f may be calculated for VMs 502d-f in a similar manner.

Referring back to step 418, the method 400 sums the calculated values of cumulative energy usage values 532a-f with the unaccounted energy values 534a-f to derive an overall estimated energy usage value 540a-f for each VM 502a-f. For example, FIG. 5D illustrates a table indicating how the calculated accounted for energy usage values 532a-f (e.g., CPU utilization values, volatile storage utilization values, network utilization values, and non-volatile utilization values) may be summed with the unaccounted energy usage values 534a-f to yield individualized overall energy usage values for each VM 502a-f.

At this point, overall energy usage values for each VM 502a-f have been calculated and the process 400 ends. Nevertheless, the steps of the aforedescribed method may be repeatedly performed for estimating the overall energy usage values for each VM 502a-f at a future point in time, or for calculating the overall energy usage values for other VMs in the computing environment.

It may be important to note that FIGS. 5A-5D present an example scenario of energy used by certain components of a computing environment, and that the types of components used, as well as the measured energy levels may be different than what is shown and described. Additionally, although FIG. 4 describes an example method 400 that may be performed estimating an amount of energy used by each VM, the features of the method 400 may be embodied in other specific forms without deviating from the spirit and scope of the present disclosure. For example, the method 400 may perform additional, fewer, or different operations than those described in the present examples. As another example, the method 400 may be performed in a sequence other than what is described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
a host that is executed to manage deployment of a plurality of workspaces; and
a processor and a memory coupled to the processor, the memory storing program instructions that, upon execution by the processor, cause the IHS to:
obtain an amount of energy consumed by one or more resources of the host;
obtain workspace usage metrics of each of the workspaces;
determine, using the workspace usage metrics, a proportionate amount of energy used by each of the workspaces; and
determine an overall amount of energy used by each workspace over a period of time to create an overall energy consumption amount for each workspace, the overall amount of energy determined by distributing the amount of energy used by each of the resources across each of the workspaces according to the proportionate amount of energy used by each of the workspaces.

2. The IHS of claim 1, wherein the resource comprises a processor, and the workspace usage metric comprises an amount of CPU utilization relative to the CPU utilization of the other workspaces.

3. The IHS of claim 1, wherein the resource comprises a volatile storage device, and the workspace usage metric comprises an amount of volatile storage utilization relative to the volatile storage utilization of the other workspaces.

4. The IHS of claim 1, wherein the resource comprises a network device, and the workspace usage metric comprises an amount of network utilization relative to the network utilization of the other workspaces.

5. The IHS of claim 4, wherein the instructions, upon execution, further cause the controller to:
obtain the amount of energy consumed by a network device, the network device communicatively coupled to a plurality of the hosts through a plurality of connections;
obtain port level utilization metrics of each of the connections for each of the hosts;
determine, using the port level utilization metrics, a proportionate amount of network device energy used by each of the hosts; and
determine an overall amount of energy used by each workspace by distributing the amount of network device energy according to the proportionate amount of energy used by each of the hosts.

6. The IHS of claim 5, wherein the host comprises a workspace orchestration system that manages the operation of the workspaces.

7. The IHS of claim 5, wherein the host comprises a hypervisor and the workspaces each comprise a virtual machine.

8. The IHS of claim 1, wherein the resource comprises a non-volatile storage device, and the workspace usage metric comprises an amount of non-volatile storage utilization relative to the non-volatile storage utilization of the other workspaces.

9. The IHS of claim 8, wherein the instructions, upon execution, further cause the controller to:

obtain the amount of energy consumed by a non-volatile storage device, the non-volatile storage device communicatively coupled to a plurality of the hosts through a plurality of connections;
obtain port level utilization metrics of each of the connections for each of the hosts;
determine, using the port level utilization metrics, a proportionate amount of non-volatile storage device energy used by each of the hosts; and
determine an overall amount of energy used by each workspace by distributing the amount of non-volatile storage device energy according to the proportionate amount of energy used by each of the hosts.

10. The IHS of claim 1, wherein the instructions, upon execution, further cause the controller to:
obtain a residual amount of energy consumed by another resource of the IHS, the residual amount of energy comprising a total amount of energy consumed by the IHS minus the energy consumed by the one or more resources; and
determine an energy level to be attributed to each workspace by distributing the residual amount of energy to each of the workspaces according to the determined proportionate amount of energy used by each of the workspaces.

11. A workspace energy usage estimation method comprising:
obtaining an amount of energy consumed by one or more resources of a host that is executed to manage deployment of a plurality of workspaces;
obtaining workspace usage metrics of each of the workspaces;
determining, using the workspace usage metrics, a proportionate amount of energy used by each of the workspaces; and
determining an overall amount of energy used by each workspace over a period of time to create an overall energy consumption amount for each workspace, the overall amount of energy determined by distributing the amount of energy used by each of the resources across each of the workspaces according to the proportionate amount of energy used by each of the workspaces.

12. The workspace energy usage estimation method of claim 11, further comprising:
obtaining the amount of energy consumed by a network device, the network device communicatively coupled to a plurality of the hosts through a plurality of connections, wherein the resource comprises a network device, and the workspace usage metric comprises an amount of network utilization relative to the network utilization of the other workspaces;
obtaining port level utilization metrics of each of the connections for each of the hosts;
determining, using the port level utilization metrics, a proportionate amount of network device energy used by each of the hosts; and
determining an overall amount of energy used by each workspace by distributing the amount of network device energy according to the proportionate amount of energy used by each of the hosts.

13. The workspace energy usage estimation method of claim 11, further comprising:
obtaining the amount of energy consumed by a non-volatile storage device, the non-volatile storage device communicatively coupled to a plurality of the hosts through a plurality of connections, wherein the resource comprises a non-volatile storage device, and the workspace usage metric comprises an amount of non-volatile storage utilization relative to the non-volatile storage utilization of the other workspaces;
obtaining port level utilization metrics of each of the connections for each of the hosts;
determining, using the port level utilization metrics, a proportionate amount of non-volatile storage device energy used by each of the hosts; and
determining an overall amount of energy used by each workspace by distributing the amount of non-volatile storage device energy according to the proportionate amount of energy used by each of the hosts.

14. The workspace energy usage estimation method of claim 11, further comprising:
obtaining a residual amount of energy consumed by another resource of the IHS, the residual amount of energy comprising a total amount of energy consumed by the IHS minus the energy consumed by the one or more resources; and
determining an energy level to be attributed to each workspace by distributing the residual amount of energy to each of the workspaces according to the determined proportionate amount of energy used by each of the workspaces.

15. A hardware memory device having program instructions stored thereon that, upon execution by a processor of a display, cause the instructions to:
obtain an amount of energy consumed by one or more resources of a host that is executed to manage deployment of a plurality of workspaces;
obtain workspace usage metrics of each of the workspaces;
determine, using the workspace usage metrics, a proportionate amount of energy used by each of the workspaces; and
determine an overall amount of energy used by each workspace over a period of time to create an overall energy consumption amount for each workspace, the overall amount of energy determined by distributing the amount of energy used by each of the resources across each of the workspaces according to the proportionate amount of energy used by each of the workspaces.

16. The hardware memory device of claim 15, wherein the resource comprises a processor, and the workspace usage metric comprises an amount of CPU utilization relative to the CPU utilization of the other workspaces.

17. The hardware memory device of claim 15, wherein the resource comprises a volatile storage device, and the workspace usage metric comprises an amount of volatile storage utilization relative to the volatile storage utilization of the other workspaces.

18. The hardware memory device of claim 17, wherein the instructions, upon execution, further cause the controller to:
obtain the amount of energy consumed by a network device, the network device communicatively coupled to a plurality of the hosts through a plurality of connections, wherein the resource comprises a network device, and the workspace usage metric comprises an amount of network utilization relative to the network utilization of the other workspaces;
obtain port level utilization metrics of each of the connections for each of the hosts;

determine, using the port level utilization metrics, a proportionate amount of network device energy used by each of the hosts; and determine an overall amount of energy used by each workspace by distributing the amount of network device energy according to the proportionate amount of energy used by each of the hosts.

19. The hardware memory device of claim 15, wherein the instructions, upon execution, further cause the controller to:

obtain the amount of energy consumed by a non-volatile storage device, the non-volatile storage device communicatively coupled to a plurality of the hosts through a plurality of connections, wherein the resource comprises a non-volatile storage device, and the workspace usage metric comprises an amount of non-volatile storage utilization relative to the non-volatile storage utilization of the other workspaces;

obtain port level utilization metrics of each of the connections for each of the hosts;

determine, using the port level utilization metrics, a proportionate amount of non-volatile storage device energy used by each of the hosts; and determine an overall amount of energy used by each workspace by distributing the amount of non-volatile storage device energy according to the proportionate amount of energy used by each of the hosts.

20. The hardware memory device of claim 15, wherein the instructions, upon execution, further cause the controller to:

obtain a residual amount of energy consumed by another resource of the IHS, the residual amount of energy comprising a total amount of energy consumed by the IHS minus the energy consumed by the one or more resources;

determine an energy level to be attributed to each workspace by distributing the residual amount of energy to each of the workspaces according to the determined proportionate amount of energy used by each of the workspaces.

* * * * *